United States Patent [19]
Braess

[11] 3,992,046
[45] Nov. 16, 1976

[54] SAFETY INSTALLATION FOR MOTOR VEHICLES

[75] Inventor: Hans-Hermann Braess, Stuttgart-Stammheim, Germany

[73] Assignee: Dr. Ing. h.c.F. Porsche Aktiengesellschaft, Germany

[22] Filed: Sept. 4, 1974

[21] Appl. No.: 502,943

[30] Foreign Application Priority Data
Sept. 5, 1973   Germany............................ 2344689

[52] U.S. Cl. .............................. 296/65 A; 297/216
[51] Int. Cl.² ........................................ B60R 21/08
[58] Field of Search ...................... 296/65 A, 65 R; 297/216; 244/122 R

[56] References Cited
UNITED STATES PATENTS

| | | | |
|---|---|---|---|
| 2,959,446 | 11/1960 | Thompson ........................ | 296/65 A |
| 3,552,795 | 1/1971 | Perkins et al. ...................... | 297/216 |
| 3,561,806 | 2/1971 | Tse .............................. | 296/65 A X |
| 3,832,000 | 8/1974 | McDonnell ...................... | 296/65 A |
| 3,858,930 | 1/1975 | Calandra.......................... | 297/216 X |

*Primary Examiner*—Robert R. Song
*Assistant Examiner*—Michael J. Forman
*Attorney, Agent, or Firm*—Craig & Antonelli

[57] ABSTRACT

A safety installation for vehicles, particularly motor vehicles which cooperates with a seat that is relatively movable with respect to the vehicle body; the safety installation thereby displaces the seat during an impact accident by means of an actuating mechanism in such a manner that the seat deceleration rises rapidly within the limit of the human tolerance range and is then held at an essentially constant level within this limit.

13 Claims, 4 Drawing Figures

SAFETY INSTALLATION FOR MOTOR VEHICLES

The present invention relates to a safety installation for motor vehicles, which cooperates with a seat constructed so as to be relatively movable with respect to the vehicle body.

A safety installation for the aforementioned type is known (U.S. Pat. No. 2,959,446) in which seats are mounted on a base plate. This base plate is guided on rollers and is supported at damping devices or shock absorbers with respect to the vehicle body. However, this prior art construction entails the disadvantage that during an impact accident, after an initial, very brief damping or shock-absorbing phase of the shock absorbers, the deceleration of the vehicle commences gradually and the deceleration of the passengers, insofar as the same are retained at the seat by means of a retention system, commences delayed with respect to the vehicle deceleration. This has as a consequence that the head deceleration of the passengers is increased at the end of the impact with respect to the vehicle deceleration which may lead to serious injuries in the human body.

It is therefore the aim of the present invention to provide an installation, by means of which the aforementioned disadvantages are eliminated.

The underlying problems are solved according to the present invention in that the safety installation moves or displaces during an impact accident the seat including a retention system by means of an actuating mechanism in a direction opposite the driving direction and/or in the driving direction in such a manner that the seat deceleration increases rapidly within the limits of the human tolerance range and is held on an essentially constant level disposed within these limits. For that purpose, the installation of the present invention includes a control apparatus which adjusts the actuating mechanism in dependence of transmitters or transducers. A first transmitter or transducer measures the collision intensity while further transmitters or transducers measure the velocity change of the seat and/or of the vehicle. The first transmitter or transducer is preferably coordinated to a pressure-controlled shock or impact-force absorption. The second transmitter or transducer is mounted at the seat and detects the seat deceleration. However, the possibility also exists that the second transducer or transmitter is coordinated to the vehicle passenger cell and picks up the deceleration thereof during an impact accident. The actuating mechanism is constituted by a pressure-controlled cylinder.

In one advantageous embodiment of the present invention, the actuating mechanism is provided with an element supplying a force-travel-characteristic, whose characteristic is matched to the deceleration progress of the passenger cell. The actuating mechanism is formed by a hydraulic cylinder which cooperates with a hydraulic shock-absorbing mechanism. The element is coordinated to the cylinder and is formed by a conical plug and by an aperture cooperating with the same.

In a further advantageous embodiment of the present invention, the safety installation displaces the seat at the beginning of an impact accident opposite the driving direction by way of an adjusting mechanism. This adjusting mechanism includes a hydraulic cylinder which is connected with a hydraulic shock absorption mechanism. The adjusting mechanism may also cooperate with an energy storage means.

The advantages which are principally achieved by the present invention reside in that with an impact accident, the deceleration progress of the passengers is so controlled by a movement or displacement of the seat in a direction opposite the driving direction or in the driving direction that no injuries to the human body are caused. The transmitters or transducers pick-up the values relevant during an accident course and feed the same to the control apparatus which displaces or adjusts the seat by influencing the actuating mechanism. In that connection, the first transmitter or transducer is coordinated to a pressure-controlled shock-absorbing mechanism, by means of which the collision intensity (force with which the shock absorption is acted upon) is picked up. A second transmitter or transducer picks up the velocity change of the seat or of the passenger cell. The seat is adjusted by way of the actuating mechanism with these magnitudes of the transmitters or transducers and the values fed into the control apparatus.

In lieu of the construction involving regulating-technical means, an actuation of the seat may also be realized by means involving control-technical means. For that purpose, an element is suited which supplies a force-travel characteristic. This characteristic is matched to the deceleration curves for typical impact accident situations (for example, impact against a fixed obstacle) which are known from tests.

In addition to these constructions, the deceleration course of the passengers may also be kept favorable by an installation which at the beginning of an impact accident, for example, after contacting an obstacle, displaces the seat exclusively opposite the driving direction. This has the advantage that an additional deceleration path or travel (for example, up to the windshield) is gained for the passengers on the inside of the passenger cell, whereby the construction of known retention systems, for example, of belts can take place in the direction toward lesser forces (better tolerance for the passengers).

Furthermore, the possibility exists by the type of movement or displacement of the seat to utilize the same as retention mechanism for the passengers seated in the rear of a vehicle.

These and further objects, features and advantages of the present invention will become more apparent from the following description when taken in connection with the accompanying drawing which shows, for purposes of illustration only, several embodiments in accordance with the present invention, and wherein.

Figure 1:
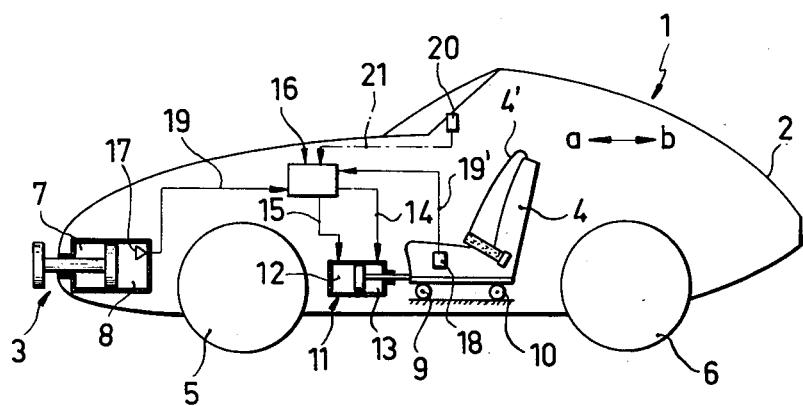
FIG. 1 is a schematic side elevational view of a motor vehicle equipped with a safety installation according to the present invention.

Referring now to the drawing wherein like reference numerals are used throughout the various views to designate like parts, and more particularly to FIG. 1, a motor vehicle generally designated by reference numeral 1 is illustrated in this figure which includes a body 2, an impact- or shock-absorbing mechanism generally designated by reference numeral 3 and mounted at the front end, a seat 4 with a belt retention system 4' and wheels 5 and 6.

The shock-absorbing mechanism 3 is of hydraulic construction and includes the pressure spaces 7 and 8. The seat 4 is constructed so as to be relatively movable with respect to the vehicle 1 on rollers 9 and 10 and cooperates with a hydraulic actuating mechanism generally designated by reference numeral 11. The actuating mechanism 11 includes pressure spaces 12 and 13. A control apparatus generally designated by reference numeral 16 of conventional construction is connected with the pressure spaces 12 and 13 by way of lines 14 and 15, respectively; the control apparatus 16 adjusts the actuating mechanism 11 and therewith the seat 4 in the vehicle longitudinal direction a-b in dependence on transmitters or transducers 17 and 18. Since the control apparatus 16, utilizes conventional means such as, for example, electronic logic circuits of conventional type as known in the art which form no part of the present invention, a detailed description thereof is dispensed with herein for the sake of simplicity.

The first transmitter or transducer 17 is coordinated to the pressure space 8 of the shock-absorbing mechanism 3 and is connected with the control apparatus 16 by way of a line 19. This transmitter or transducer 17 is so constructed that it measures the force which occurs at the shock-absorption mechanism 3 during an accident and transmits the same as an input magnitude to the control apparatus 16. The second transmitter or transducer 18 is mounted at the seat 4, measures the seat deceleration and is connected with the control apparatus 16 by way of a line 19'. The possibility also exists to mount a further transmitter or transducer 20 at the body or at the vehicle cell, by means of which the deceleration of the passenger cell is measured in case of an accident. This transmitter or transducer is connected to the control apparatus by means of a line 21. The transmitter or transducers 17, 18 and 20 involve conventional elements which are commercially available for such purposes.

In case of an impact accident, at first the shock-absorption mechanism 3 is stressed or acted upon whereby a pressure builds up in the pressure space 8. The magnitude of this pressure build-up, which is dependent on the collision intensity or on the force with which this shock-absorption is acted upon, is indicated to the control apparatus 16 by the transmitter or transducer 17. Simultaneously therewith, the magnitude of the deceleration of the seat is indicated to the control apparatus 16 by the transmitter or transducer 18 and also that of the transmitter or transducer 20. These magnitudes are compared with the values in the control apparatus 16 which have been previously fed or stored therein by means of conventional memory devices or the like. With a certain gravity of the accident, the pressure space 12 of the actuating mechanism 11 is now acted upon during the starting phase whereby the seat is displaced by a certain amount opposite the driving direction a or in the direction b. If the deceleration of the vehicle and of the seat has reached a certain level, which is indicated to the control apparatus 16 by the transmitters or transducers 18 and 20, then the control apparatus 16 will act upon the pressure space 13 whereby the seat 4 is displaced in the driving direction a.

Figure 2:
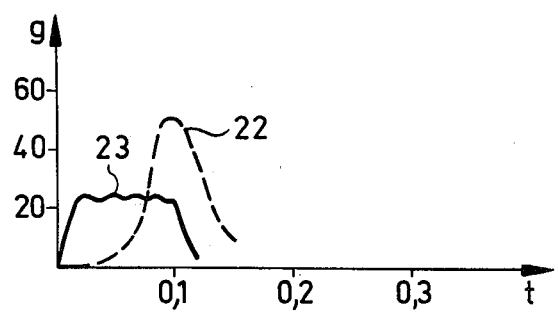
FIG. 2 is a diagram containing the deceleration curves for the safety system of FIG. 1.

FIG. 2 illustrates a diagram of the deceleration course of the vehicle 1 and of the seat 4. The time t is thereby applied along the abscissa and the deceleration (g) is applied along the ordinate. The curve 22 represents the deceleration progress of the vehicle 1. According thereto, the curve 22 rises gradually or relatively late and to a magnitude which is intolerable for the human being. The curve 23 represents the deceleration progress of the seat 4. It is quite clear therefrom that as a result of the movement of the seat opposite the driving direction a, a steep rise of the curve 23 takes place and a movement of the seat in the direction a, an essentially constant level is maintained. The rise as well as the level of the curve 23 lies within the limits of the human tolerance range.

Figure 3:
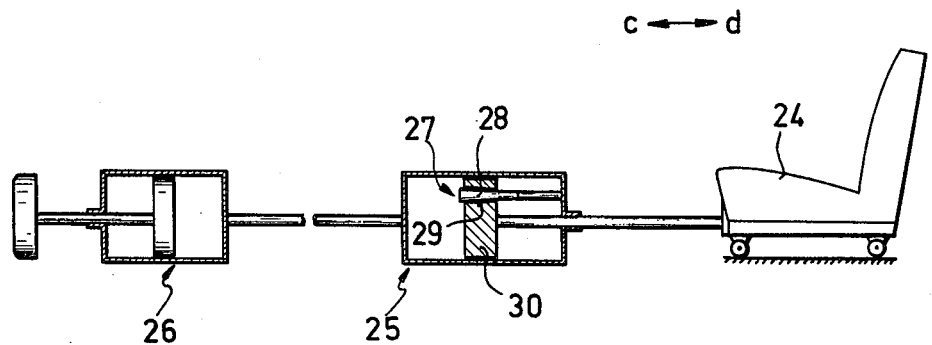
FIG. 3 is a somewhat schematic partial view of FIG. 1 illustrating another embodiment on an enlarged scale.

FIG. 3 illustrates an embodiment in which a seat 24 is adjusted in the direction d or c by an actuating mechanism generally designated by reference numeral 25 and by a shock-absorbing mechanism generally designated by reference numeral 26 operatively connected therewith. The actuating mechanism 25 is formed by a hydraulic cylinder which includes an element 27 that supplies a force-travel characteristic. The element 27 is represented by a conical plug 28 and an opening 29.

With an impact accident, a pressure will build up very rapidly in the shock-absorbing mechanism 26 which continues into the actuating mechanism 25. The piston 30 is acted upon with this pressure and the seat 24 is moved initially in the direction d and after a predetermined deceleration progress in the direction c. The movement of the seat 24 is controlled by the element 27 and more particularly in that during a relative movement 30 the flow cross section between the pin 28 and the opening 29 changes.

Figure 4:
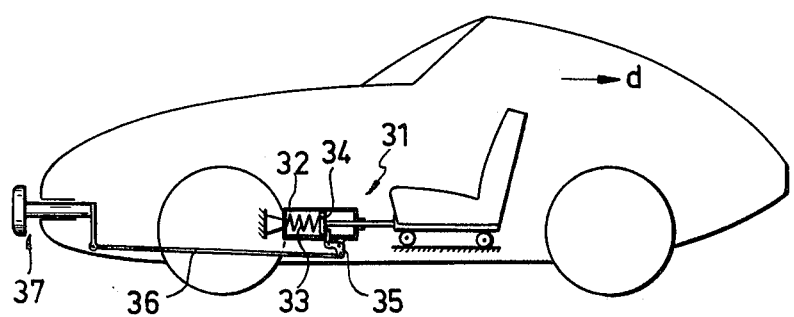
FIG. 4 is a schematic side elevational view, similar to FIG. 1, and illustrating a further embodiment of a motor vehicle equipped with a safety installation according to the present invention.

According to FIG. 4, an adjusting mechanism generally designated by reference numeral 31 is formed by an energy storage device 32. The energy storage device 32 includes a spring 33 which is supported at a piston 34. The piston 34 cooperates with a detent mechanism 35 which is connected with a shock-absorbing mechanism 37 by way of a linkage 36.

If the shock-absorbing mechanism 37 is acted upon with a certain force, the detent mechanism 35 disengages and the spring which is stressed, displaces the piston 34 and the seat 35 opposite the driving direction and more particularly in the direction D.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A safety installation for vehicles with a vehicle body, which installation cooperates with a seat means rectilinearly movable along the longitudinal axis of the vehicle body and having a retention means for retaining a passenger, characterized in that the safety installation includes means operatively associated with the seat means and vehicle body for displacing the seat means first in a direction opposite to the driving direction during the beginning of an impact accident such that the deceleration of the seat means rises relatively rapidly but within the limit of the human tolerance range and is then held at a substantially constant tolerable level within this limit by thereafter positively displacing the seat means along said longitudinal axis in the driving direction.

2. A safety installation according to claim 1, characterized in that the displacing means includes a pressure controlled cylinder operatively associated between said control means and said seat means.

3. A safety installation according to claim 1, characterized in that the displacing means includes transmitter means and control means which adjusts the seat means in dependence upon the transmitter means.

4. A safety installation according to claim 3, characterized in that said transmitter means includes a first transmitter means which measures the collision intensity and further transmitter means which are operable to measure at least one velocity change of the seat means and of the vehicle.

5. A safety installation according to claim 4, characterized in that the further transmitter means measure velocity changes of both the seat means and of the vehicle.

6. A safety installation according to claim 4 characterized in that a further transmitter means is mounted at the seat means and measures the seat deceleration.

7. A safety installation according to claim 4, characterized in that a further transmitter means is coordinated to the passenger cell and measures the deceleration thereof during an impact accident.

8. A safety installation according to claim 4, characterized in that the first transmitter means is coordinated to a pressure control means for absorbing shocks imparted to the vehicle body during impact collisions.

9. A safety installation according to claim 8, characterized in that a further transmitter means is mounted at the seat means and measures the seat deceleration.

10. A safety installation according to claim 9, characterized in that a further transmitter means is coordinated to the passenger cell and measures the deceleration thereof during an impact accident.

11. A safety installation according to claim 8, characterized in that a further transmitter means is coordinated to the passenger cell and picks up the deceleration thereof during an impact accident.

12. A safety installation for motor vehicles in operative association with seat means rectilinearly movable along the longitudinal axis direction of the vehicle body and having a retention means for retaining a passenger, characterized in that the safety installation includes means operatively connected with the seat means and vehicle body for initially displacing the seat means opposite the driving direction at the beginning of an impact accident and then positively displacing the seat means along said longitudinal axis in the driving direction to maintain a substantially constant but tolerable human deceleration level during the remainder of the impact accident.

13. A safety installation according to claim 12, characterized in that the displacing means includes a hydraulic cylinder which is operatively connected with a hydraulic means for absorbing shocks imparted to the vehicle body during impact collisions.

* * * * *